(12) United States Patent
Nakamasu et al.

(10) Patent No.: US 9,923,424 B2
(45) Date of Patent: Mar. 20, 2018

(54) RADIAL GAP TYPE ROTATING ELECTRICAL MACHINE, BLOWER, COMPRESSOR, AND AIR CONDITIONER

(71) Applicant: DAIKIN INDUSTRIES, LTD., Osaka-shi, Osaka (JP)

(72) Inventors: Shin Nakamasu, Kusatsu (JP); Yoshinari Asano, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 428 days.

(21) Appl. No.: 14/430,987

(22) PCT Filed: Jul. 12, 2013

(86) PCT No.: PCT/JP2013/069117
§ 371 (c)(1),
(2) Date: Mar. 25, 2015

(87) PCT Pub. No.: WO2014/050261
PCT Pub. Date: Apr. 3, 2014

(65) Prior Publication Data
US 2015/0236557 A1    Aug. 20, 2015

(30) Foreign Application Priority Data

Sep. 26, 2012 (JP) ................................ 2012-212014

(51) Int. Cl.
*H02K 1/27* (2006.01)
*F04D 13/06* (2006.01)
(Continued)

(52) U.S. Cl.
CPC ........... *H02K 1/2786* (2013.01); *F04B 17/03* (2013.01); *F04D 13/06* (2013.01); *H02K 1/30* (2013.01)

(58) Field of Classification Search
CPC ........ H02K 1/2786; H02K 1/30; H02K 21/22; H02K 2213/03; F04B 17/03; F04B 35/04;
(Continued)

(56) References Cited

U.S. PATENT DOCUMENTS 5,298,827 A    3/1994 Sugiyama
7,902,712 B2   3/2011 Nakamasu et al.
(Continued)

FOREIGN PATENT DOCUMENTS

CN    101120499 A    2/2008
EP    0544310 A2    6/1993
(Continued)

*Primary Examiner* — Alex W Mok
(74) *Attorney, Agent, or Firm* — Birch, Stewart, Kolasch & Birch, LLP (57) ABSTRACT

A radial gap type rotating electrical machine includes a field and an armature. The field includes a permanent magnet and a magnetic ring which serves as a back yoke of the permanent magnet. The magnetic ring is provided at a position farther from the armature than the permanent magnet, and includes a recess at a magnetic pole center. The magnetic pole center is a center of a magnetic pole in a circumferential direction with respect to a rotation axis. A thickness of the recess in the radial direction around the rotation axis as a center comes to locally thin.

12 Claims, 10 Drawing Sheets

(51) Int. Cl.
*F04B 17/03* (2006.01)
*H02K 1/30* (2006.01)

(58) Field of Classification Search
CPC ...... F04B 39/00; F04D 13/06; F04D 25/0633; F04D 25/064
USPC .......................... 310/264, 156.12; 417/410.1
See application file for complete search history.

(56) References Cited

U.S. PATENT DOCUMENTS

| | | |
|---|---|---|
| 2005/0110356 A1 | 5/2005 | Imamura et al. |
| 2009/0212652 A1 | 8/2009 | Nakamasu et al. |
| 2010/0126234 A1 | 5/2010 | Maekawa |
| 2010/0289364 A1* | 11/2010 | Koyanagi ............ H02K 1/2786 310/154.28 |
| 2012/0126651 A1* | 5/2012 | Li ........................ H02K 29/03 310/156.01 |

FOREIGN PATENT DOCUMENTS

| | | |
|---|---|---|
| EP | 1855371 A1 | 11/2007 |
| JP | 61-94548 A | 5/1986 |
| JP | 5-153744 A | 6/1993 |
| JP | 11-146584 A | 5/1999 |
| JP | 2000-184643 A | 6/2000 |
| JP | 2002-84690 A | 3/2002 |
| JP | 2002-112479 A | 4/2002 |
| JP | 2003-143788 A | 5/2003 |
| JP | 2004-104962 A | 4/2004 |
| JP | 3737492 B2 | 1/2006 |
| JP | 2007-244026 A | 9/2007 |
| JP | 4004894 B2 | 11/2007 |
| JP | 4065829 B2 | 3/2008 |
| JP | 2008-86166 A | 4/2008 |
| JP | 2009-278838 A | 11/2009 |
| JP | 2009-278857 A | 11/2009 |
| JP | 2010-178493 A | 8/2010 |

* cited by examiner

RADIAL GAP TYPE ROTATING ELECTRICAL MACHINE, BLOWER, COMPRESSOR, AND AIR CONDITIONER

TECHNICAL FIELD

The present disclosure relates to a rotating electrical machine, and more particularly, to a so-called radial gap type rotating electrical machine. The rotating electrical machine can be employed as a drive source for a compressor which compresses refrigerant and for a blower in an air conditioner, for example.

BACKGROUND ART

A so-called radial gap type rotating electrical machine includes a field which rotates on a rotation axis, and an armature which faces the field through a cylindrical gap in a direction vertical to the rotation axis. The field includes, for example, a permanent magnet and the armature face the permanent magnet through the cylindrical gap. The armature includes teeth and an armature coil which is concentrated-wound around the teeth.

To satisfy both reduction in an environment load such as global warming and realization of convenient and comfortable living environment, requirement of enhancing efficiency with respect to a rotating electrical machine, especially an electric motor further increases.

On the other hand, cost of raw materials also increases, and there is an extremely harsh reality of requirement of cost reduction of the rotating electrical machine.

To realize a compact and efficient rotating electrical machine capable of satisfying both the requirements, a rotating electrical machine using a high-performance permanent magnet is most dominant.

When such a rotating electrical machine is used under various kinds of environments, depending upon temperature characteristics of a permanent magnets, a ferrite magnet has a problem of demagnetization at low temperature, and a neodymium-iron-boron magnet has a problem of demagnetization at high temperature, for example.

In the case of the neodymium-iron-boron magnet for example, a demagnetization resistance of a magnet can be increased by enhancing coercivity by including dysprosium and terbium. However, these elements are rare and expensive.

The demagnetization resistance is enhanced also by increasing a thickness of a permanent magnet. However, use of a thick permanent magnet leads to cost increase.

Prior art documents which are associated with the present application are described as follows: Japanese Patent Application Laid-Open No. 61-94548; Japanese Patent Application Laid-Open No 11-146584; Japanese Patent Application Laid-Open No. 2002-84690; Japanese Patent Application Laid-Open No. 2002-112479; Japanese Patent Application Laid-Open No. 2003-143788; Japanese Patent Publication No. 4004894; Japanese Patent Application Laid-Open No. 2004-104962; Japanese Patent Publication No. 3737492; and Japanese Patent Publication No. 4065829. For example, Japanese Patent Application Laid-Open No. 61-94548 shows a so-called inner rotor type configuration in which a rotor is placed in the vicinity of a rotation axis. A yoke is placed closer to the rotation axis than a permanent magnet, and a hollow gap is provided in the yoke. According to Japanese Patent Application Laid-Open No. 61-94548, magnetic flux which is produced by an armature coil and which causes armature counteraction does not pass through the hollow gap and hence, a magnetic circuit which causes the armature counteraction is prevented from being produced. Magnetic flux which causes the armature counteraction acts as demagnetization field with respect to a permanent magnet.

SUMMARY

Means for Solving the Problem

However, in Japanese Patent Application Laid-Open No. 61-94548, a width of one of bridge-shaped portions between the hollow gaps is extremely small, and a width of the other bridge-shaped portion between the hollow gaps is relatively large. Hence, there is a concern that torque ripple while a rotor is driving is increased due to this asymmetric nature.

Although a width in a radial direction portion between an outer peripheral surface of the yoke and the hollow gap is the smallest in the vicinity of a center position of a magnetic pole, the bridge-shaped portion has a wide portion, and the yoke is connected with a larger width on the location closer to the central hole than the hollow gap. Hence, reduction in magnetic resistance between adjacent permanent magnets is small, and demagnetization magnetic flux is not effectively reduced.

On the other hand, if the magnetic resistance of the yoke is reduced by reducing its magnetic permeability, torque characteristics and efficiency of the rotating electrical machine are deteriorated.

The present disclosure has been accomplished in view of these problems, and it is an object of the present disclosure to provide a technique for inexpensively enhancing a demagnetization resistance of a permanent magnet without deteriorating torque characteristics and efficiency characteristics.

Means for Solving the Problems

A first aspect of a radial gap type rotating electrical machine (9) according to the present disclosure includes a field (1) and an armature (2). The field includes permanent magnets (11) forming a predetermined number of magnetic poles, and the field rotates on a rotation axis (3). The armature faces the permanent magnets through a cylindrical gap (4) in a direction perpendicular to the rotation axis, and includes a larger number of teeth (21) than the predetermined number, and an armature coil (22) which is concentrated-wound around a winding portion of the teeth.

The field further includes a magnetic ring (12) which is provided at a location farther from the permanent magnet than the armature and which serves as a back yoke of the permanent magnet.

The magnetic ring includes a recess (121) having a thickness in a radial direction around the rotation axis as a center comes to locally thin at a magnetic pole center (110) which is a center in a circumferential direction with respect to the rotation axis of the magnetic pole.

According to a second aspect of the radial gap type rotating electrical machine (9) according to the present disclosure, in the first aspect, a ratio ($\alpha$) of a thickness of the magnetic ring in the radial direction to a width (W) of the winding portion in the circumferential direction as viewed from the rotation axis is 0.3 or less at the magnetic pole center with respect to the circumferential direction.

According to a third aspect of the radial gap type rotating electrical machine (9) of the present disclosure, in the second aspect, a thickness of the magnetic ring in the radial direction employs a constant value (T) at a location except in the vicinity of the magnetic pole center. A product of a length (b) of a thin region in the circumferential direction where the magnetic ring comes to the thinnest in the vicinity of the magnetic pole center and a value obtained by subtracting a thickness (t) of the thin region in the radial direction from the constant value is defined as a first value; a product of the constant value and a value obtained by dividing a length of the magnetic ring in the circumferential direction on the side of the permanent magnet in the circumferential direction by the predetermined number is defined as a second value; and a ratio ($\beta$) of the first value to the second value is 5% or more.

In a fourth aspect of the radial gap type rotating electrical machine (9) of the present disclosure, in the first aspect, the ratio ($\alpha$) of the thickness of the magnetic ring in the radial direction to the width (W) of the winding portion in the circumferential direction as viewed along the rotation axis is 0.1 or more at the magnetic pole center in the circumferential direction.

According to a fifth aspect of the radial gap type rotating electrical machine (9) of the present disclosure, in the first aspect, the magnetic ring has a configuration where a plurality of magnetic bodies are connected to each other in the circumferential direction. Preferably, each of the magnetic bodies configuring the magnetic ring has a substantially arc shape, and the recess is placed in a portion where the magnetic bodies are connected to each other.

In the first to fifth aspects of the radial gap type rotating electrical machine (9), a ratio of the number of teeth to the predetermined number is 3/2, for example. The field rotates on the side of an outer periphery of the armature, for example.

The first to fifth aspects of the radial gap type rotating electrical machine (9) may be employed for a blower or a compressor. The blower and the compressor may be provided in an air conditioner.

Effects

According to the first aspect of the radial gap type rotating electrical machine of the present disclosure, demagnetization field applied to the permanent magnet is reduced when current is applied without lowering field magnetic flux which links with the armature coil from the permanent magnet when no current is applied and thus, a demagnetization resistance is enhanced without lowering torque.

According to the second aspect of the radial gap type rotating electrical machine of the present disclosure, it becomes easy to control a demagnetization resistance using a length of a region where the magnetic ring becomes locally thin.

According to the third aspect of the radial gap type rotating electrical machine of the present disclosure, an effect for reducing the demagnetization ratio becomes remarkable by enhancing the magnetic resistance in the thin region.

According to the fourth aspect of the radial gap type rotating electrical machine of the present disclosure, by providing the recess, it is possible to suppress the reduction in inductive voltage.

According to a desirable configuration of the fifth aspect of the radial gap type rotating electrical machine of the present disclosure, it is possible to further enhance the magnetic resistance at a position where the recess is provided.

Objects, features, aspects and merits of the present disclosure will become apparent from the following detailed description and accompanying drawings.

DESCRIPTION OF EMBODIMENT

<<Description of Configuration>>

Figure 1:
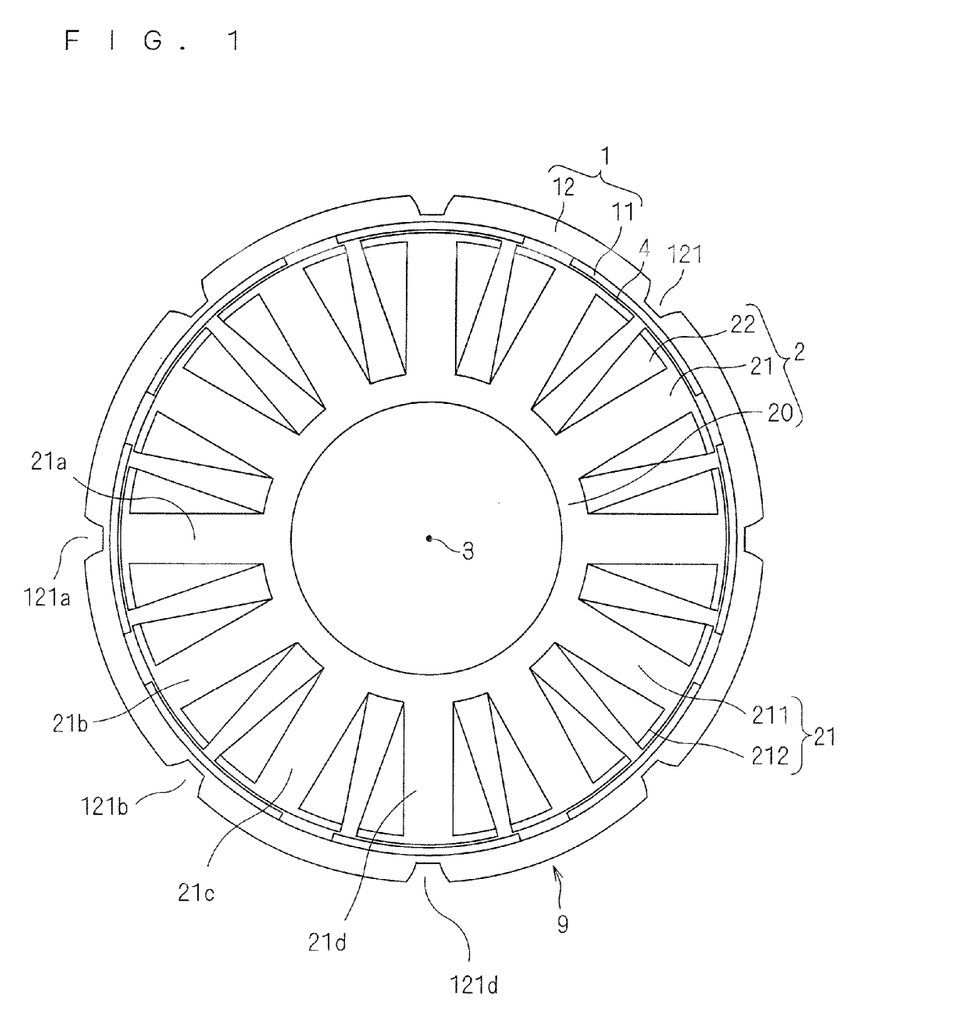
FIGS. 1 and 2 are sectional views showing a configuration of a rotating electrical machine according to one embodiment of the present disclosure.

FIG. 1 is a sectional view showing a configuration of rotating electrical machine 9 according to an embodiment of the present disclosure. FIG. 1 is a sectional view which is perpendicular to a rotation axis 3. The rotating electrical machine 9, including a field 1 which rotates on the rotation axis 3 as a rotation center, and an armature 2 which faces the field 1 through a cylindrical gap 4 in a direction perpendicular to the rotation axis 3, has a radial gap type configuration. Here, a configuration of a so-called outer rotor type radial gap type rotating electrical machine in which the field 1 rotates on an outer periphery side of the armature 2 is exemplified.

The field 1 includes permanent magnets 11 for forming a predetermined number of magnetic poles, and the armature 2 faces the permanent magnets 11 through a gap 4. The armature 2 includes teeth 21 and an armature coil 22 which is concentrated-wound around the teeth 21.

Each of the teeth 21 includes a winding portion 211 around which the armature coil 22 is wound, and a flange 212 spreading in a circumferential direction at an end of the winding portion 211 on the side of the permanent magnet 11.

The armature coil 22 does not mean a single conductive wire configuring the armature coil 22, but the armature coil 22 means a mode of conductive wire which is collectively wound unless otherwise designated in the present application. The same can be said also in the drawings. A winding-starting line, a winding-ending line, and a line connecting both the lines to each other are also omitted in the drawings.

The number of teeth 21 is larger than the number (the above-described predetermined number) of magnetic poles. For example, a ratio of the number of teeth 21 to the number of magnetic poles is 3/2. FIG. 1 shows that the number of teeth 21 is twelve and the number of magnetic poles is eight.

Here, a case where one permanent magnet 11 forms one magnetic pole is exemplified, and eight permanent magnets 11 are provided. In this regard, an annular resin magnet may be employed instead of the permanent magnet 11. In this case, a magnetized portion and a non-magnetized portion are alternately formed, and the magnetized portions correspond to the permanent magnets 11 shown in FIG. 1.

The field 1 further includes a magnetic ring 12 which serves as a back yoke. Specifically, the magnetic ring 12 is provided at a position farther from the armature 2 than the permanent magnet 11. For example, the magnetic ring 12 can be formed from laminated magnetic steel sheets.

Each of the armatures 2 further includes a magnetic ring 20 which connects the teeth 21 to each other. Specifically, the magnetic ring 20 is provided at a position farther from the field 1 than the teeth 21.

Figure 2:
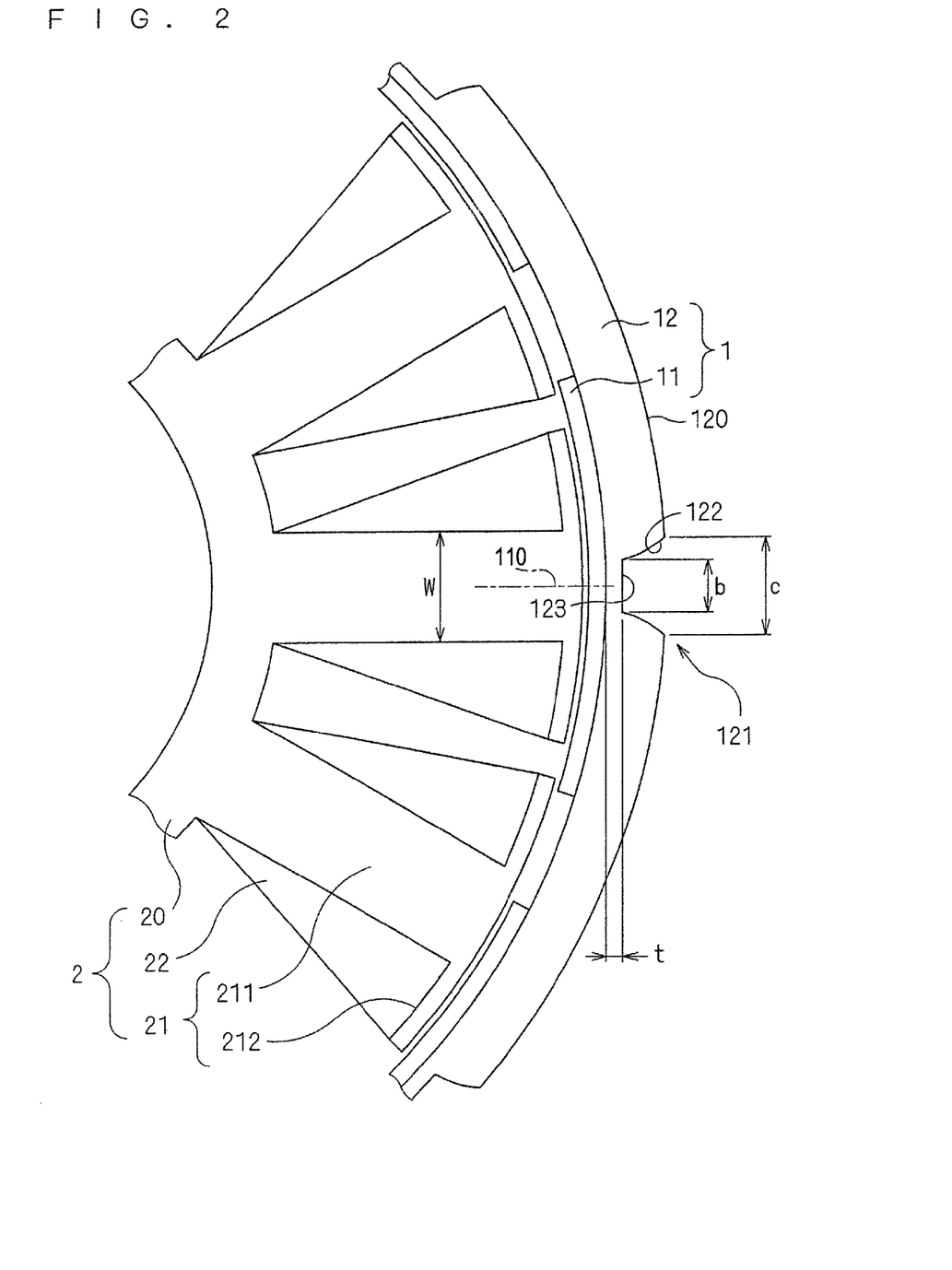

FIG. 2 is an enlarged sectional view of a portion of FIG. 1. The magnetic ring 12 includes a recess 121 in the magnetic pole center 110. The magnetic pole center 110 is a center of the magnetic pole in the circumferential direction of the rotation axis 3. A thickness of the recess 121 in a radial direction around the rotation axis 3 as a center locally comes to thin.

Specifically, each of the recesses 121 includes a bottom surface 123 and a side surface 122. Of the side surface the magnetic ring 12 in the radial direction, a surface 120 which is farther from the armature 2 than the permanent magnet 11 extends from a position where the recess 121 is not provided to the bottom surface 123 through the side surface 122. At a position where the bottom surface 123 is provided, the magnetic ring 12 has a thickness t in the radial direction, and this can be grasped as a thickness of the magnetic ring 12 in the radial direction in the magnetic pole center 110.

As a future reference, a length b of the bottom surface 123 in the circumferential direction, a length c of an opening of the recess 121 in the circumferential direction, and a width W of the winding portion 211 in the circumferential direction are introduced. The length b can be grasped as a circumferential length of a thin region where the magnetic ring 12 comes to the thinnest in the vicinity of the magnetic pole center 110. This thin region is a portion of the magnetic ring 12 at a position where the bottom surface 123 is provided.

<<Influence of Recess 121 on Magnetic Flux>>

Figure 3:
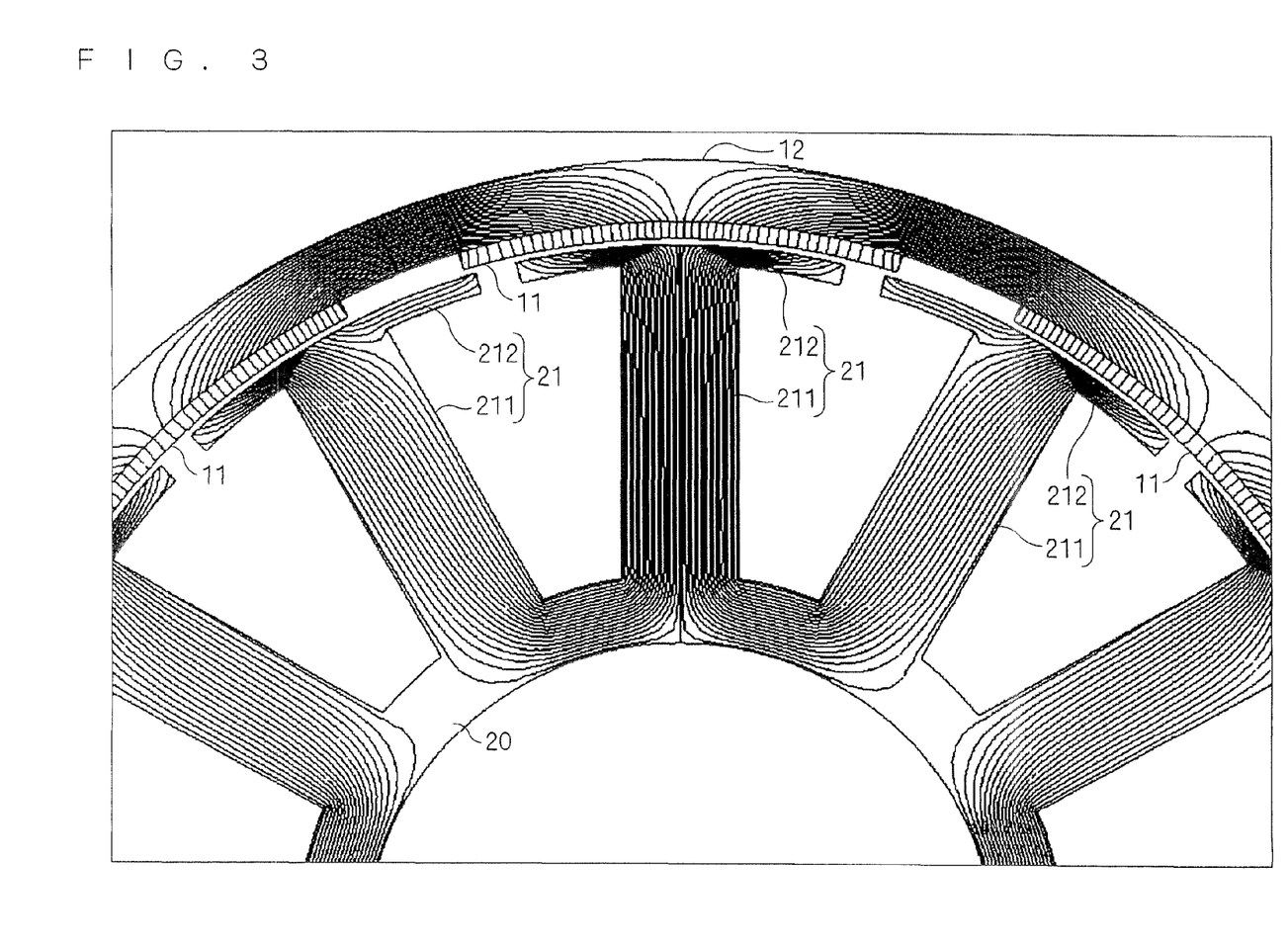
FIG. 3 is a sectional view showing a magnetic flux line flowing through a rotating electrical machine of a conventional configuration when no current is applied.
Figure 4:
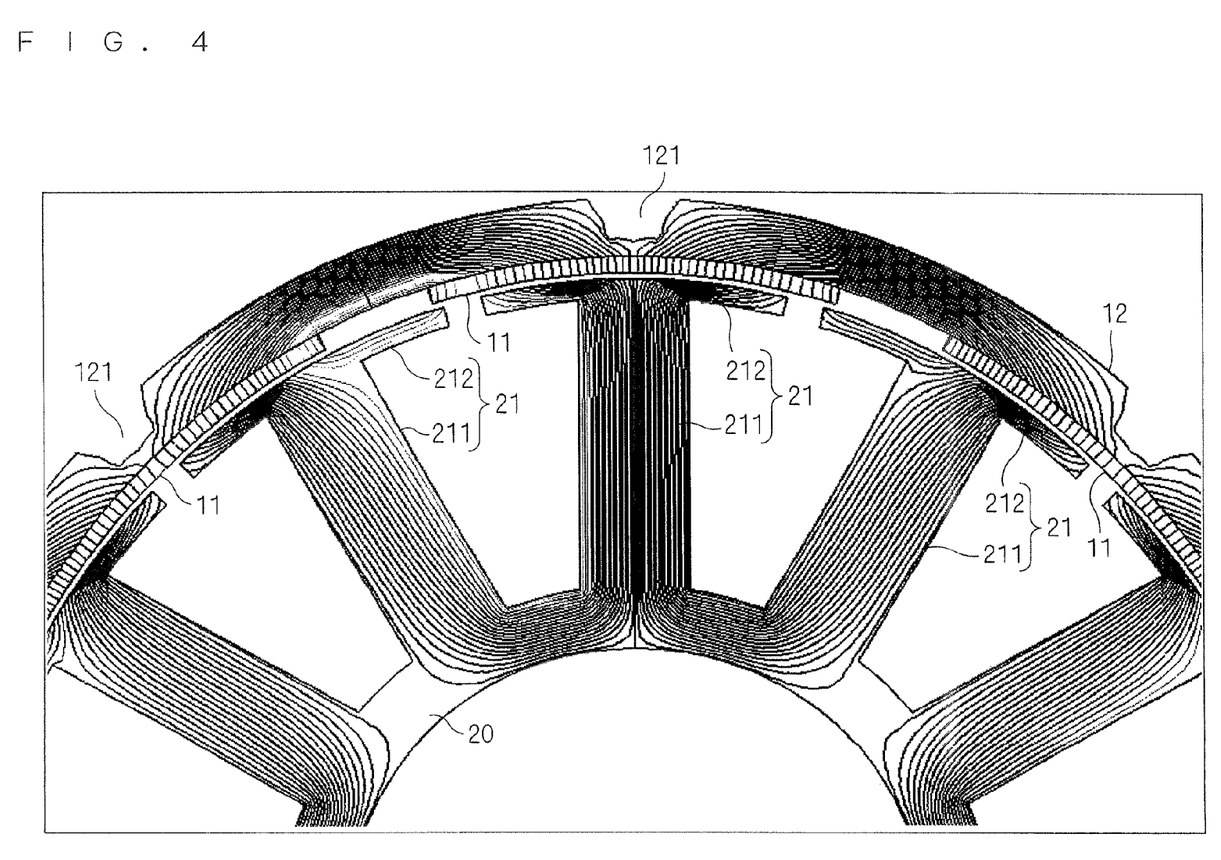
FIG. 4 is a sectional view showing a magnetic flux line flowing through the rotating electrical machine according one embodiment of the present disclosure when no current is applied.

Both FIGS. 3 and 4 show a magnetic flux line of field magnetic flux in a cross section which is perpendicular to the rotation axis 3 (see FIG. 1). In both FIGS. 3 and 4, illustrations of the armature coils 22 (see FIGS. 1 and 2) are omitted, and a magnetic flux line when current does not flow through the armature coils 22 is shown.

FIG. 3 shows a case where the magnetic ring 12 is not provided with the recess 121, and FIG. 4 shows a case where the magnetic ring 12 is provided with the recess 121. FIG. 3 should show a magnetic flux line of field magnetic flux which flows through a rotating electrical machine of a conventional configuration.

By comparing FIGS. 3 and 4 with each other, it is found that field magnetic flux which flows from the permanent magnet 11 to the teeth 21 is not lowered even if the recess 121 exists. That is, even if the recess 121 exits, since field magnetic flux which links with the armature coil 22 is not lowered, torque is not lowered.

It is expected that this is because since the recess 121 is provided in the magnetic pole center 110, field magnetic flux from the permanent magnet 11 can flow to any of both sides of the recess 121 in the circumferential direction.

Especially when a ratio of the number of teeth 21 to the number of magnetic poles is 3/2, referring to FIG. 1, one of the teeth 21 (shown as a tooth 21a in FIG. 1) which is opposed to one of the recesses 121 (shown as a recess 121a in FIG. 1) is adjacent, in the circumferential direction, to one of the teeth 21 (shown as a tooth 21d in FIG. 1) which is opposed to other recess 121 (shown as a recess 121d in FIG. 1) while sandwiching two teeth 21 (shown as teeth 21b and 21c in FIG. 1). The teeth 21b and 21c are symmetrically placed in the circumferential direction with respect to the recess 121 (shown as a recess 121b in FIG. 1) which is sandwiched by the recesses 121a and 121d in the circumferential direction. Hence, also from this symmetric placement, it is expected that the existence of the recess 121 does not lower the field magnetic flux which links with the armature coil 22.

Figure 5:
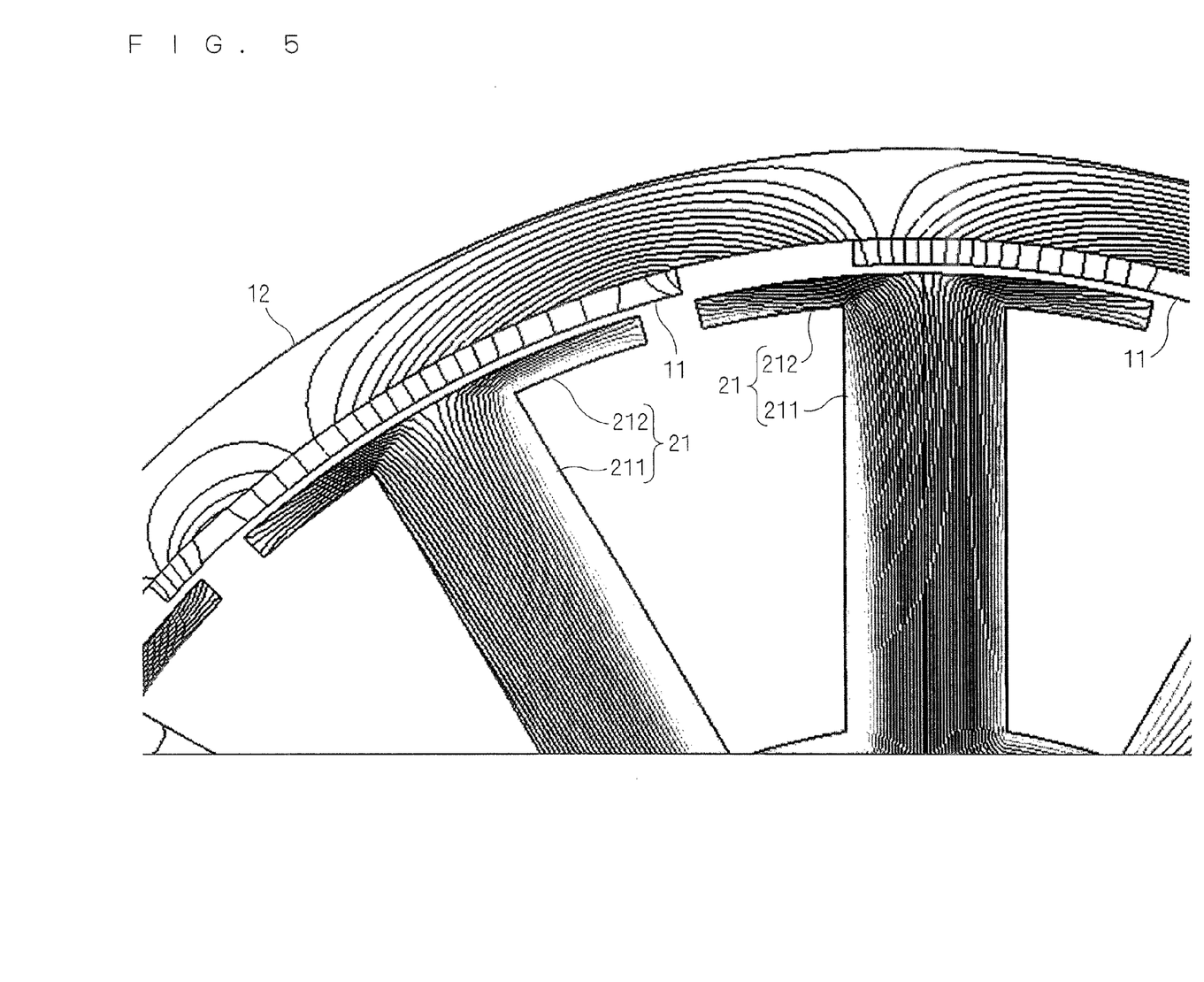
FIG. 5 is a sectional view showing a magnetic flux line flowing through a rotating electrical machine of a conventional configuration when current is applied.
Figure 6:
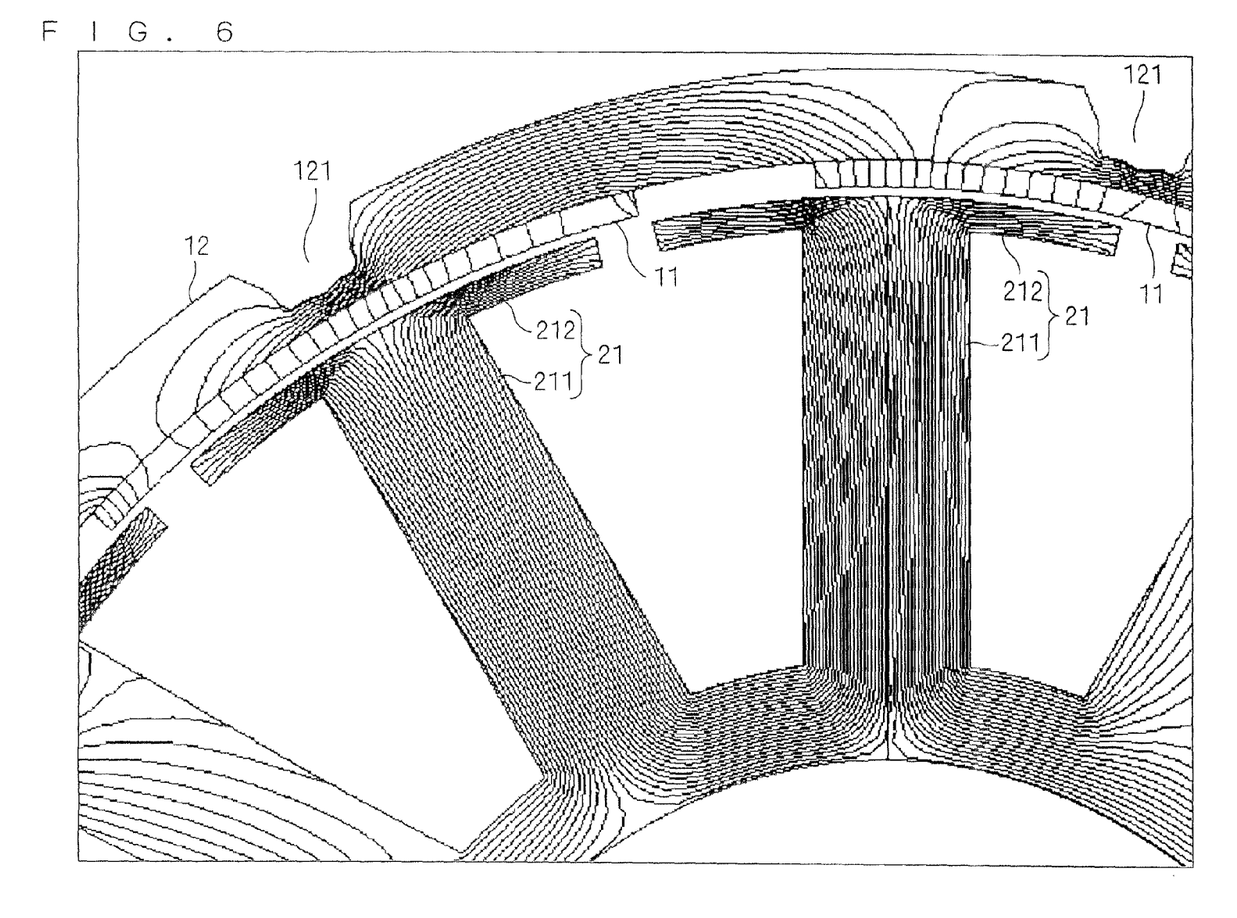
FIG. 6 is a sectional view showing a magnetic flux line flowing through the rotating electrical machine according one embodiment of the present disclosure when current is applied.

Both FIGS. 5 and 6 show a magnetic flux line in a cross section which is perpendicular to the rotation axis 3 (see FIG. 1). In both FIGS. 5 and 6, illustration of the armature coils 22 (see FIGS. 1 and 2) is omitted, and a magnetic flux line of magnetic field (referred to as "armature magnetic field", hereinafter) generated by current which flows through the armature coils 22 is shown.

A case where current flows through the armature coils 22 in a direction in which armature magnetic fields of reversed phase are generated in adjacent teeth 21 is shown. For example, when the rotating electrical machine 9 is driven by three-phase AC, armature magnetic fields having phase difference of 120° or 240° each other are generated in the adjacent teeth 21. Hence, FIGS. 3 and 4 show patterns where the armature magnetic field is most prone to flow between the adjacent teeth 21.

FIG. 5 shows a case where the magnetic ring 12 is not provided with the recess 121, and FIG. 6 shows a case where the magnetic ring 12 is provided with the recess 121. FIG. 5 should show a magnetic flux line of armature magnetic field which flows through a rotating electrical machine of a conventional configuration.

When polarity of the armature magnetic field is opposite from that of the field magnetic flux, the armature magnetic field flowing through the permanent magnet 11 functions as demagnetization magnetic field. Hence, a location where magnetic flux lines are congested in the permanent magnet 11 shown in FIGS. 5 and 6 can be grasped as a location where demagnetization of the permanent magnet 11 comes to noticeable.

When the recess 121 is not provided as shown in FIG. 5, in the permanent magnet 11 to which the teeth 21 (left teeth 21 in FIG. 5: corresponding to the tooth 21d in FIG. 1) are opposed, concentration of magnetic fluxes is not noticeable. However, when a teeth 21 (right teeth 21 in FIG. 5: corresponding to the tooth 21c in FIG. 1) is opposed to a circumferential end of the permanent magnet 11, concentration of magnetic fluxes comes to noticeable at the circumferential end of the permanent magnet 11.

On the other hand, in the configuration shown in FIG. 6, concentration of magnetic fluxes is moderated at the circumferential end of the permanent magnet 11. This is desirable in term of moderating demagnetization of the permanent magnet 11.

As described above, according to the rotating electrical machine 9, field magnetic flux which links with the armature coil 22 from the permanent magnet 11 when current is not applied is not lowered, demagnetization magnetic field applied to the permanent magnet 11 when current is applied is lowered and therefore, a demagnetization resistance is enhanced without deteriorating torque characteristics and efficiency characteristics.

Further, since this enhancement is provided by the existence of the recess 121, this enhancement can be realized by an inexpensive technique.

Figure 7:
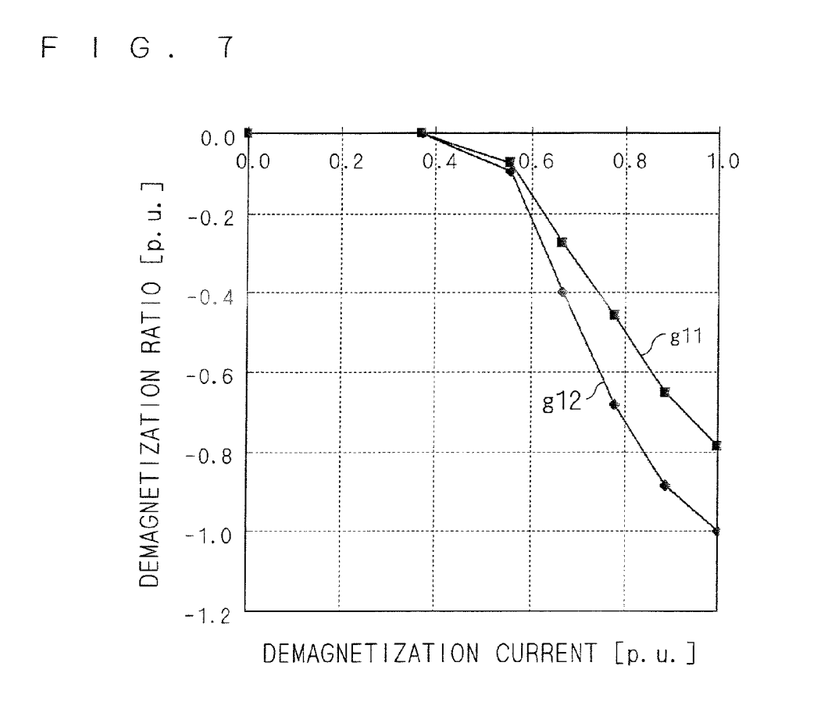
FIG. 7 is a graph showing a relation between demagnetization current and a demagnetization ratio of a permanent magnet.

FIG. 7 is a graph exemplifying a relation between current which generates armature magnetic field (here, this current is defined as "demagnetization current" while focusing attention to effect to demagnetize permanent magnet 11) and a demagnetization ratio of the permanent magnet 11. A curve line g11 shows a relation in this embodiment, i.e., a relation between demagnetization current and a demagnetization ratio when the recess 121 is provided. A curve line g12 shows a relation in a conventional configuration, i.e., a relation between demagnetization current and a demagnetization ratio when the recess 121 is not provided. To compare these two relations, "per unit" (expressed as "p.u." in FIG. 7) is employed as units of both the demagnetization current and the demagnetization ratio.

In this regard, the demagnetization ratio is defined as follows. Inductive voltage obtained by driving the rotating electrical machine 9 at constant rotation speed before demagnetization current is applied is defined as V1, inductive voltage obtained by driving the rotating electrical machine 9 at the same constant rotating speed after the permanent magnet 11 is once demagnetized by applying demagnetization current is defined as V2, demagnetization ratio is obtained by (V2/V1−1), and this is expressed by a per unit method. Here, a demagnetization ratio is defined as −1 p.u. when the curve line g12 has demagnetization current 1 p.u.

As apparent from the comparison between the curve lines g11 and g12, the provision of the recess 121 reduces demagnetization ratio. That is, it can be found that the demagnetization of the permanent magnet 11 is moderated.

Figure 8:
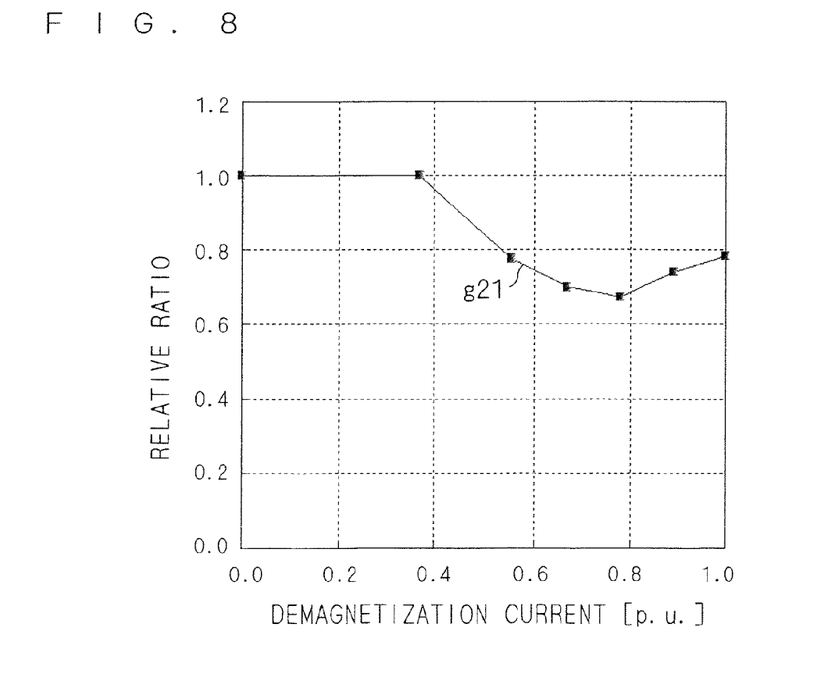
FIG. 8 is a graph showing a relation between the demagnetization current and a relative ratio of demagnetization.

FIG. 8 is a graph showing a relation between demagnetization current and a relative ratio of demagnetization. The curve line g21 shows a ratio of a value taken by the curve line g11 to a value taken by the curve line g12 in FIG. 7. That is, it is indicated that as a value taken by the curve line g21 is smaller, a degree of effect that demagnetization of the permanent magnet 11 is moderated by the recess 121 (referred to as "demagnetization ratio reducing effect", hereinafter) becomes stronger.

When the demagnetization current is small (less than 0.4 p.u.), since demagnetization is not generated in the permanent magnet 11 (demagnetization ratio=0 p.u.), the demagnetization ratio reducing effect caused by the recess 121 cannot be found. However, when the demagnetization current is large (0.4 p.u. or more), it can be found that the demagnetization ratio reducing effect is large.

Note that the curve line g21 takes a local minimum value around a location where the demagnetization current becomes 0.8 p.u in FIG. 8. However, this shows that, as shown by the curve line g12 in FIG. 7, contribution on the demagnetization ratio of the demagnetization current is becoming saturated when the recess 121 is not provided, rather than the effect caused by the recess 121 depends on the demagnetization current.

<<Preferable Shape of Recess 121>>

The recess 121 can be grasped as a shape in which a radial thickness of the magnetic ring 12 is reduced. Hence, a ratio α of a radial thickness of the magnetic ring 12 to a width W of the teeth 21 is introduced. As described above, the recess 121 has the bottom surface 123, the magnetic ring 12 has the radial thickness t at the position where the bottom surface 123 is provided, and the radial thickness can be grasped as a radial thickness of the magnetic ring 12 in the magnetic pole center 110. Therefore, α becomes equal to t/W at the position where the recess 121 is provided.

Such a ratio α is introduced due to the following reason. With respect to magnetic resistance to the magnetic flux flowing between the armature 2 and the field 1, the width W is dominant in the armature 2, and a thickness of the magnetic ring 12 is dominant in the field 1. Hence, it can be found that as the radio α is smaller, magnetic resistance to magnetic flux flowing between the armature 2 and the field 1 more strongly receives influence of a thickness of the magnetic ring 12.

At a position where the recess 121 is provided, i.e., in the magnetic pole center 110, α is equal to t/W as described above. Hence, the ratio α is fixed at this position and taken into consideration, and a preferable value of the ratio α will be considered below.

Figure 9:
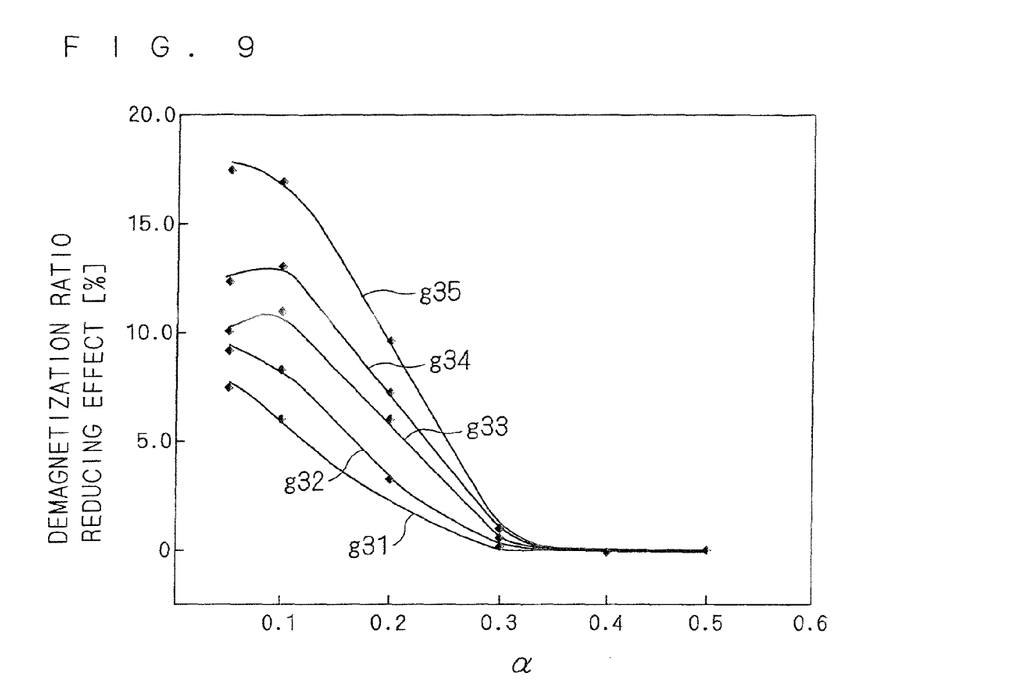
FIG. 9 is a graph showing a relation between a ratio $\alpha$ and a demagnetization ratio reducing effect (c≈b)
Figure 10:
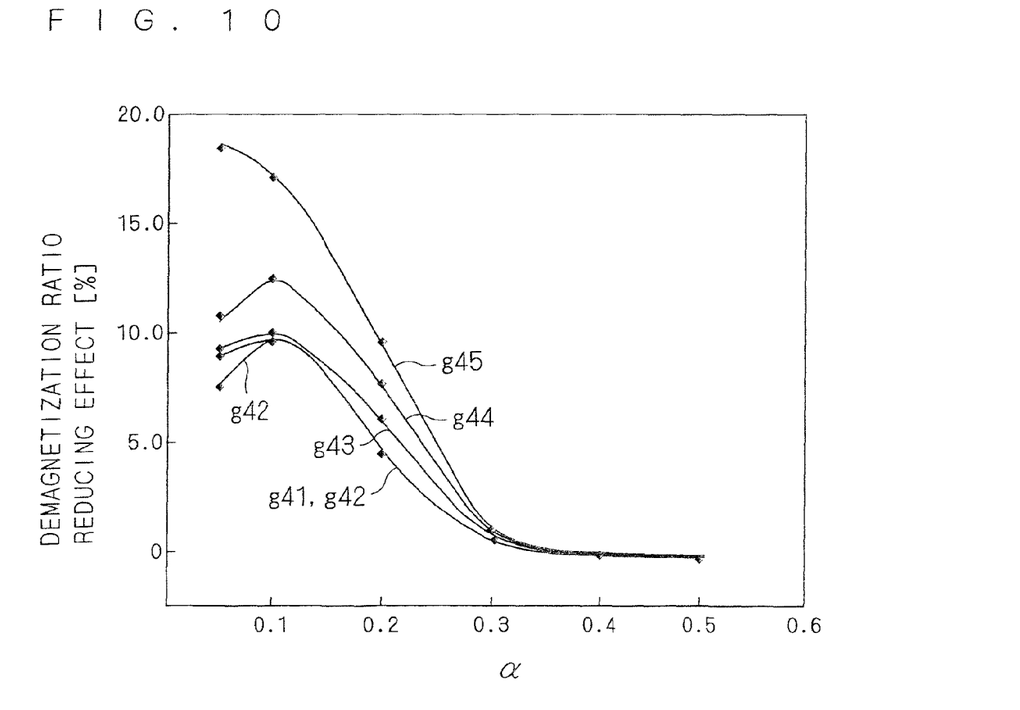
FIG. 10 is a graph showing a relation between the ratio $\alpha$ and the demagnetization ratio reducing effect (c>b)

Both FIGS. 9 and 10 are graphs showing a relation between the ratio α and the demagnetization ratio reducing effect. Here, a demagnetization ratio when the recess 121 is not provided is defined as D1, a demagnetization ratio when the recess 121 is provided is defined as D2, and the demagnetization ratio reducing effect is expressed by percentage of (D1−D2)/D1.

FIG. 9 shows a case where a circumferential length c of the opening of the recess 121 is set longer than the length b by 0.1 [mm]. This case corresponds to a configuration that the side surface 122 is substantially parallel to a radial direction in the position where the side surface 122 is provided, and roundness of radius of 0.05 [mm] is provided between the pair of side surface 122 and the surface 120.

FIG. 10 shows a case where the length c is set longer than a value b by two times of a value (T−t). In this regard, a radial thickness T (constant value is employed except in the vicinity of magnetic pole center 110: here, about 5 to 6 [mm]) of the magnetic ring 12 at a position where the recess 121 is not provided is introduced. In this case, the side surface 122 has a shape close to an arc in which a center angle is 90° between the bottom surface 123 and the surface 120.

In FIG. 9, curve lines g31, g32, g33, g34 and g35 show the above-described relation when the circumferential length b of the bottom surface 123 has values 0.25, 0.5, 2.0, 4.0 and 6.0 [mm], respectively.

In FIG. 10, curve lines g41, g42, g43, g44 and g45 show the above-described relation when the circumferential length b of the bottom surface 123 takes values 0.25, 0.5, 2.0, 4.0 and 6.0 [mm], respectively.

Because the larger the value of the length b is, the larger the influence of the recess 121 on the magnetic flux resistance is, the curve lines g31, g32, g33, g34 and g35 rise in this order, and the curve lines g41, g42, g43, g44 and g45 rise in this order. However, it is found that each of the curve lines does not show so much effects if α is larger than 0.3. It is also found that influence of the length c is small.

In other word, it is found that if the ratio α at the magnetic pole center 110 is 0.3 or lower, it becomes easy to control the demagnetization resistance using the value b.

Figure 11:
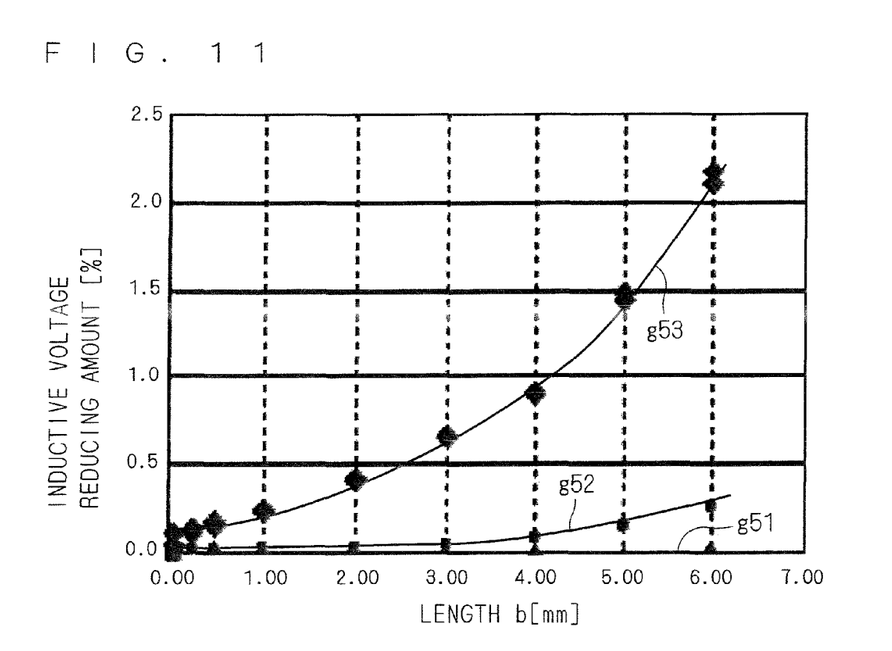
FIG. 11 is a graph showing a relation between a length b and an inductive voltage reducing amount.

FIG. 11 is a graph showing a relation between the length b and the inductive voltage reducing amount which is a torque reducing amount. Here, using the above-described inductive voltage V1, the inductive voltage reducing amount expresses, in terms of percentage, [(V1 when recess 121 is not provided)−(V1 when recess 121 is provided)]/(V1 when recess 121 is not provided). Of data used in FIGS. 9 and 10, FIG. 11 is plotted using data that the ratio α is 0.05, 0.1 and 0.2, and they are expressed by curve lines g53, g52 and g51. In this regard, in origin points, black squares are added to cases where the recess 121 is not provided.

It is found that the curve line g53 notably receives influence of the length b as compared with the curve lines g52 and g51, a reducing amount of the inductive voltage V1 is notably large, and the torque reducing amount becomes large.

Hence, from the standpoint of reduction of the inductive voltage V1 caused by forming the recess 121, i.e., from the standpoint of suppressing of torque reduction, it is desirable that the ratio α at the magnetic pole center 110 is 0.1 or more.

By the way, since the recess 121 has such a shape that a portion of the magnetic ring 12 is notched, as a region surrounded by the recess 121 is wider, the demagnetization ratio reducing effect becomes higher. Accordingly, the above-described value (T−t) is used as a radial size of the region in the radial direction, and the length b is employed as a size of this region in the circumferential direction. An area of a region which is notched from the magnetic ring 12 per one magnetic pole as viewed along the rotation axis 3 is estimated by a first value (T−t)b.

On the other hand, if the recess 121 is not provided an area of the magnetic ring 12 per one magnetic pole as viewed along the rotation axis 3 is estimated by a second value (L/G)T. Here, a circumferential length L of the magnetic ring 12 on the side of the permanent magnet 11 in the circumferential direction, and the number G of magnetic poles are introduced.

Accordingly, as a ratio β=[(T−t)b]/[(L/G)T] which is a rate of the first value to the second value is greater, contribution of the recess 121 per one magnetic pole becomes more notable. That is, the greater the ratio β is, the higher the magnetic resistance in the thin region becomes and, the demagnetization ratio reducing effect becomes notable.

Figure 12:
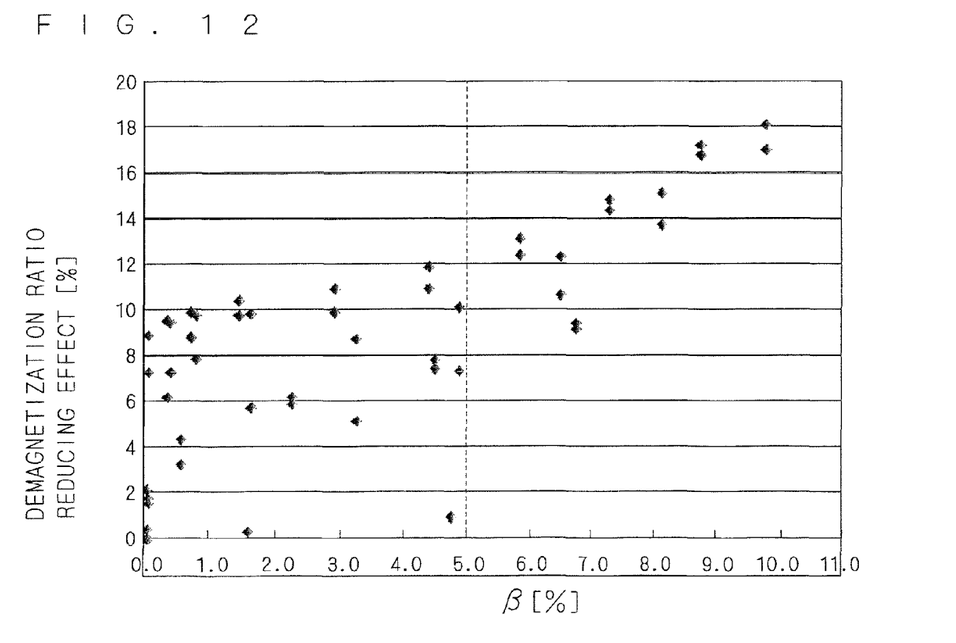
FIG. 12 is a graph showing a relation between a demagnetization ratio reducing effect and a ratio $\beta$.

FIG. 12 is a graph showing a relation between the demagnetization ratio reducing effect and the ratio β, and the ratio β is shown in terms of percentage.

In FIG. 12, various values are employed as the ratio α and the lengths b and c. However, it is found that, on the whole, when the ratio β is 5% or more, variation in the demagnetization ratio reducing effect is small and a degree thereof is also notable.

From the above-described reason, the ratio α is preferably 0.3 or less (see FIGS. 9 and 10) and is more preferably 0.1 or more (see FIG. 11). It is desirable that the ratio β is 5% or more (see FIG. 12), but from the above-described standpoint, it is desirable that specifications are set such that the ratio α becomes 0.3 or less.

<<Modification>>

Figure 13:
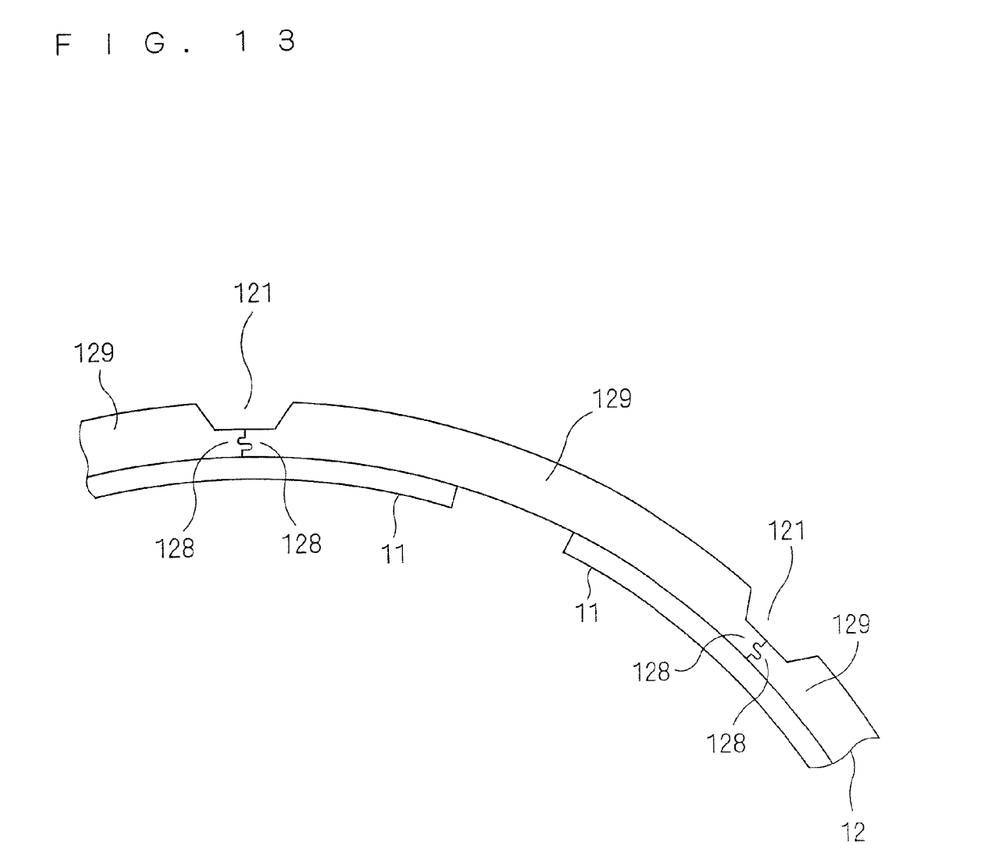
FIG. 13 is a sectional view showing a configuration of a magnetic ring.

FIG. 13 is a sectional view showing the magnetic ring 12 having a configuration that a plurality of magnetic bodies 129 are connected to one another in the circumferential direction. In FIG. 13, portions in the vicinity of the recess 121 shown in FIG. 2 are further enlarged. Each of the magnetic bodies 129 has a substantially arc shape, for example.

When the plurality of magnetic bodies 129 are placed and connected in this manner, it is desirable that a connected position thereof is a position where the recess 121 is placed. This is because magnetic resistance at this position can further be enhanced.

Circumferential ends 128 of each of the magnetic bodies 129 have concavity and convexity, and the circumferential ends 128 of the adjacent magnetic bodies 129 are fitted to each other. This is desirable in terms of reduction of the number of parts and reduction of costs.

From the standpoint of enhancement of resistance properties against a centrifugal force of the field 1 and enhancement of mechanical rigidity, it is also desirable to adhere and bond the magnetic bodies 129 to each other and the permanent magnets 11 through adhesive (epoxy resin, for example).

Alternatively, hollow holes in which the permanent magnets 11 are provided may be formed in the magnetic ring 12, bond magnets may be injected and molded in the hollow holes, and the permanent magnets 11 may be fixed to the magnetic ring 12.

Further, the entire field 1 may be molded with resin in a state where the magnetic bodies 129 are mechanically bonded to each other. This is desirable because the magnetic ring 12 is restrained from deforming while the rotating electrical machine 9 is being driven or when an electromagnetic force is applied.

Of course, the object may be achieved by combining these techniques in a composite manner.

<<Application to Air Conditioner>>

The rotating electrical machine 9 can be applied to an air conditioner. More specifically, the rotating electrical machine 9 is employed in a compressor or a blower included in the air conditioner. The compressor functions to compress refrigerant. The blower functions to send air to a heat exchanger which vaporizes or condenses refrigerant.

Although the present disclosure has been described in detail, the above description is exemplification in all of aspects, and the present disclosure is not limited to the exemplification. It should be noted that numerous modifications which are not exemplified can be made without departing from scope of the present disclosure.

The invention claimed is:

1. A radial gap type rotating electrical machine comprising:
  a field which has permanent magnets forming a predetermined number of magnetic poles and which rotates on a rotation axis as a center; and
  an armature facing the permanent magnets through a cylindrical gap in a direction perpendicular to the rotation axis and having a number of teeth more than the predetermined number and an armature coil concentrated-wound around a winding portion of the teeth, wherein
  the field further includes a magnetic ring which is provided at a position farther from the armature than the permanent magnet and which serves as a back yoke of the permanent magnet,
  the magnetic ring includes a recess, a thickness of which in a radial direction around the rotation axis as a center comes to locally thin at a magnetic pole center which is a center in a circumferential direction with respect to the rotation axis of the magnetic poles,
  a thickness of the magnetic ring in the radial direction takes a constant value except in the vicinity of the magnetic pole center,
  a product of a length of a thin region in the circumferential direction where the magnetic ring comes to the thinnest in the vicinity of the magnetic pole center and a value obtained by subtracting a thickness of the thin region in the radial direction from the constant value is defined as a first value, a product of the constant value and a value obtained by dividing a length of the magnetic ring in the circumferential direction on the side of the permanent magnet in the circumferential direction by the predetermined number is defined as a second value, and a ratio of the first value to the second value is 5% or more.

2. The radial gap type rotating electrical machine according to claim 1, wherein a ratio of a thickness of the magnetic ring in the radial direction with respect to a width of the winding portion in the circumferential direction as viewed along the rotation axis is 0.3 or less at the magnetic pole center concerning the circumferential direction.

3. The radial gap type rotating electrical machine according to claim 1, wherein a ratio of a thickness of the magnetic ring in the radial direction to a width of the winding portion in the circumferential direction as viewed along the rotation axis is 0.1 or more at the magnetic pole center concerning the circumferential direction.

4. The radial gap type rotating electrical machine according to claim 1, wherein the magnetic ring has a configuration where a plurality of magnetic bodies are connected to each other in the circumferential direction.

5. The radial gap type rotating electrical machine according to claim 4, wherein each of the magnetic bodies configuring the magnetic ring has a substantially arc shape, and the recess is placed at a portion where the magnetic bodies are connected to each other.

6. The radial gap type rotating electrical machine according to claim 1, wherein a ratio of the number of teeth to the predetermined number is 3/2.

7. The radial gap type rotating electrical machine according to claim 1, wherein the field rotates on an outer peripheral side of the armature.

8. A blower having the radial gap type rotating electrical machine according to claim 1.

9. An air conditioner having the blower according to claim 8.

10. A compressor having the radial gap type rotating electrical machine according to claim 1 for compressing refrigerant.

11. An air conditioner having the compressor according to claim 10.

12. The radial gap type rotating electrical machine according to claim 1, wherein an opening direction of said recess is opposite to said armature.

* * * * *